United States Patent Office 2,938,060
Patented May 24, 1960

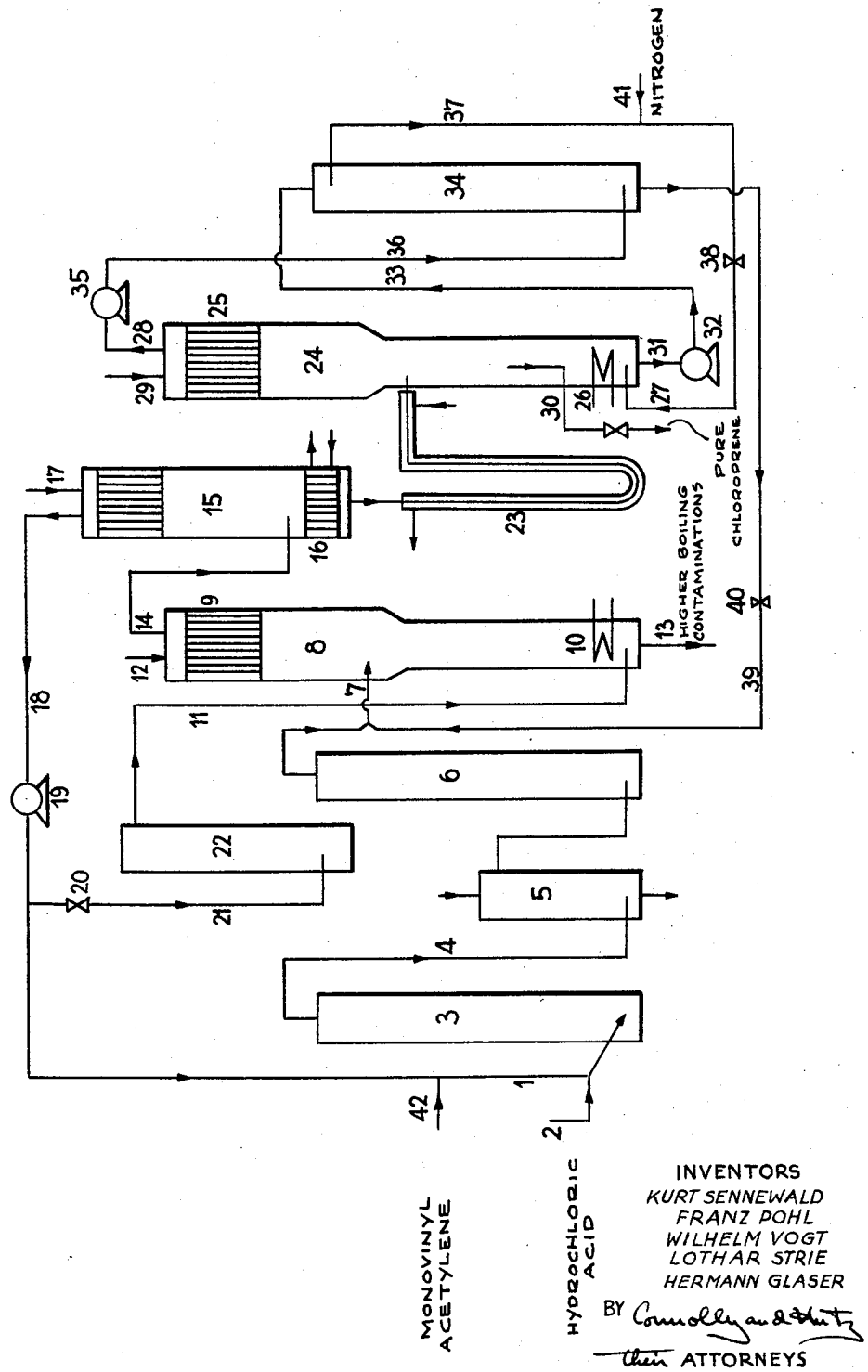

---

2,938,060

PROCESS FOR THE MANUFACTURE OF PURE CHLOROPRENE

Kurt Sennewald, Franz Pohl, and Wilhelm Vogt, Knapsack, near Cologne, Lothar Strie, Effern, near Cologne, and Hermann Glaser, Knapsack, near Cologne, Germany, assignors to Knapsack-Griesheim Aktiengesellschaft, Knapsack, near Cologne, Germany, a corporation of Germany Filed Feb. 19, 1957, Ser. No. 641,120

Claims priority, application Germany Feb. 25, 1956

5 Claims. (Cl. 260—655)

The present invention relates to a process for the manufacture of pure chloroprene by isolating chloroprene from the reaction mixture and simultaneously purifying the crude product and furthermore to a unit for carrying out said process.

It is known to use aqueous solutions of cuprous chloride containing considerable amounts of hydrochloric acid as contact solutions for the manufacture of chloroprene from monovinyl-acetylene and hydrogen chloride.

In addition to this main reaction, the contact solutions catalyze by reactions taking place simultaneously such as the addition of water to monovinyl-acetylene to form methyl-vinyl-ketone and above all the formation of dichlorobutene and so-called chloroprene oils from chloroprene and hydrogen chloride. The undesired formation of by-products may be kept within economically reasonable limits when low concentrations of chloroprene are maintained in the reactor. This fact necessitates a large excess of monovinyl-acetylene, so that chloroprene and all by-products are only present in relatively low concentration in the gas current of monovinyl-acetylene which leaves the reactor.

It has already been proposed to concentrate to about 50% by partial condensation in a condensate all reaction products present in the gas current of monovinyl-acetylene in a concentration of for example 4–5% and to separate said condensate subsequent to drying, for example, by intense cooling in a distillation at low temperature and at normal or reduced pressure. But above all, in continuous operation it turned out that with the distillations disturbing separations of chloroprene polymers are formed obstructing after a short time the distilling columns.

According to the process of the invention, the technical gas mixture containing chloroprene and monovinyl-acetylene and resulting from the reaction of monovinyl-acetylene and hydrogen chloride in contact solutions is deacidified by washing it with water and the gas mixture which contains in addition to unreacted monovinyl-acetylene usually between about 2 and about 25% by volume of chloroprene and between about 0.1 and about 5% by volume of higher boiling impurities resulting from the reaction is then conducted to a rectifying distillation. Here, the mixture is separated into higher boiling constituents, pure monovinyl-acetylene and chloroprene which is saturated with monovinyl-acetylene, from which chloroprene the monovinyl-acetylene is subsequently eliminated by distillation. The percents by volume are calculated on the total volume of monovinyl-acetylene, chloroprene and higher boiling constituents.

In the distillation stages with partial condensation, there is furthermore maintained an additional gas current of at least one inert gas, which gas current promotes the respective driving off and pressures are applied varying between about 1 and about 5 absolute atmospheres.

It is advantageous to conduct in a cycle the additional inert gas currents which are free of oxygen and which are added to the distillation stages.

Furthermore for stabilizing the liquid phases at least one substance inhibiting the polymerization is added to the distillation stages.

In the process according to the present invention it is advantageous to use monovinyl-acetylene as gas current in the distillation stages for separating the chloroprene from the higher boiling impurities and, for example, nitrogen as inert gas for the subsequent elimination of the lower boiling monovinyl-acetylene from the chloroprene.

According to the invention, it is possible to avoid the disturbing separation of polymers of chloroprene among others by performing the separation of chloroprene from the high boiling impurities such as methylvinyl-ketone, dichlorobutene and chloroprene oils as well as from the lower boiling monovinyl-acetylene in distilling columns in which an additional strong gas current is maintained. By this procedure the chloroprene vapor in the gas volumes of the distillation columns is, on the one hand, always strongly diluted; on the other hand the partial pressures of the chloroprene in the gas volumes are reduced thereby and a general reduction of the distillation temperatures is brought about.

The additional gas current therefore reduces the partial pressure of chloroprene in a manner that it is possible to distill the chloroprene at low temperatures similar to the vacuum.

Finally, the process of the invention is carried out under such conditions of pressure that a penetration of atmospheric oxygen is prevented, that is, at least under normal pressure and preferably under excess pressure. It is known that it is not possible to entirely prevent the penetration of atmospheric oxygen into distillations under reduced pressure which fact unusually stimulates the polymerization. Summing up, it can be said that the distillation according to the invention is carried out under conditions such that no polymerization takes place.

It is advantageous, for example, to operate in a manner that the gas mixture containing in addition to unreacted monovinyl-acetylene, chloroprene and higher boiling impurities resulting from the reaction such as dichlorobutene, chloroprene oils and/or methylvinyl-ketone is conducted to a first distillation stage where the higher boiling impurities obtained in the sump are separated and the pure gas mixture containing chloroprene and monovinyl-acetylene, which mixture leaves at the head of the first distillation stage, is then conducted to a second distillation stage from which the mono-vinyl-acetylene is taken off at the head and reconducted in a cycle to the reaction. In the sump of the second stage, chloroprene is obtained which is saturated with monovinylacetylene and which, after cooling to a temperature between about 0° and about +40° C. preferably between about 0° and about +20° C., is conducted to a third distillation stage in which the monovinyl-acetylene is blown off at the head with the aid of a gas current of at least one inert gas such as nitrogen, carbon monoxide, carbon dioxide, hydrogen, methane, argon or helium. In the sump of the third stage, pure chloroprene is formed as final product. It is possible to do without the cooling of the chloroprene saturated with monovinyl-acetylene between the second and the third distillation stage, for example, in case the temperature of the mixture taken from the sump of the second stage already corresponds to the temperature required at the inlet into the third distillation stage.

With the procedure described, it is furthermore possible to obtain by the additional gas current of for example nitrogen in the separation of the monovinyl-acetylene from the chloroprene a desensitizing of the explosive monovinyl-acetylene by dilution.

As inert gas for expelling the monovinyl-acetylene from the chloroprene in the third distillation stage, there may be used all gases which are insoluble or nearly insoluble in monovinyl-acetylene and in chloroprene and which do not favor polymerization and are free of unbound oxygen. Hydrocarbons having more than 2 carbon atoms are not suitable as inert gases in the cycle of the third distillation stage since they are very soluble. They are suitable however, as shown later, for diluting and desensitizing the cycle of monovinyl-acetylene.

The mixture of monovinyl-acetylene and inert gas taken off at the head of the third stage and consisting of about 1 part by volume of monovinyl-acetylene for 2–50 parts by volume of inert gas is subsequently introduced in a counter-current to a washing liquid consisting of at least one substance such as chloroprene, acetone, methanol or of oils of compounds having an aromatic carbon skeleton and thus freed of monovinyl-acetylene whereupon the inert gas is reconducted in a little cycle to the sump of the third distillation stage.

According to a further step of the process of the present invention, an additional strong gas current of monovinyl-acetylene is maintained in the first and second distillation stages for driving off the chloroprene from the higher boiling impurities. This gas current is first introduced into the sump of the first distillation stage whereby the quantities of the additional gas amount to about 1–20 parts by volume calculated on 1 part by volume of chloroprene in the starting gas mixture. Of course, different proportions in the composition of the gas mixture prevail upon leaving the first and upon entering the second distillation stage whereby it must be taken into consideration that together with the chloroprene, monovinyl-acetylene from the starting gas which has arrived at the first distillation stage is drawn off at the head of the first stage together with the monovinyl-acetylene from the cycle and is introduced into the second stage.

The amount of monovinyl-acetylene from the starting gas mixture and the additional gas leaving together at the head of the second stage is then decomposed in a manner that the amount of additional gas is cycled and the excess of monovinyl-acetylene is reconducted into the preceding reaction of monovinyl-acetylene and hydrogen chloride in contact solutions.

The starting gas mixture leaving the reaction may be dried by means of calcium chloride after having been washed with water prior to the introduction into the first distillation stage. Drying by intense cooling proved to be unsuitable since in addition to water other components are condensed. It is also possible to dispense with drying and to separate the portion of water carried over by the reaction gases during the later distillation. In the same way as the starting gas mixture of the distillation is dried, the additional gas conducted in the cycle and consisting of monovinyl-acetylene may be dried by means of calcium chloride prior to reconducting it into the first distillation stage.

In the usual three distillation stages with partial condensation, pressures between about 1 and about 10 absolute atmospheres, preferably between about 1 and about 5 absolute atmospheres, and temperatures between about −20° C. and about +60° C. are maintained, whereas in the following stage for washing out the monovinyl-acetylene from the inert gas, pressures between about 1 and about 50 absolute atmospheres and temperatures between about −40° and about +20° C. are maintained. It is advantageous to maintain in the distillation stages pressures between about 1.02 atmospheres (0.02 atmosphere gauge) and about 2.5 atmospheres (1.5 atmospheres gauge), for example between 1.5 atmospheres (0.5 atmosphere gauge) and 2 atmospheres (1 atmosphere gauge) and temperatures between about −10° and about +50° C., whereas in the following stage for washing out the monovinyl-acetylene from the inert gas it is advantageous to maintain pressures between about 1.05 atmospheres (0.05 atmosphere gauge) and about 10 atmospheres (9 atmospheres gauge) and temperatures between about −30° and 0° C. The relatively low distillation temperatures are therefore situated between −10° and +40° C. In the sump temperatures between about +45° and about +60° C. may also exist.

It is possible as already indicated to work at normal pressure as well as at elevated pressure. But a slight excess pressure should advantageously prevail in the distilling columns whereas in the following washing out of the inert gas the pressures are higher than the pressures in the columns. Therefore, in the washing tower generally the highest pressure prevails.

In the process according to the invention, the ratio of the volume of the portion of chloroprene in the starting gas mixture being distilled to the volume of the monovinyl-acetylene which is introduced as additional gas into the sump of the first distillation stage advantageously varies between about 1:5 and about 1:10.

According to the invention, at least one substance for the stabilization of the liquid phase inhibiting the polymerization is added to the distillation stages, for example at the head. Among others, saturated solutions of phenothiazine in chloroprene may be injected as polymerization inhibitors in each of the, for example, three distilling columns. Generally, solutions of phenothiazine of 2% strength are used. It is also possible to add the phenothiazine in solid form and then to dissolve it in the distilling columns.

The monovinyl-acetylene is recovered by boiling out from the washing liquid which is used for washing out the inert gas current charged with monovinyl-acetylene and conducted in the little cycle whereupon the monovinyl-acetylene may be reconducted into the large starting cycle.

After having washed out the monovinyl-acetylene of the inert gas current conducted in the little cycle, it is usually necessary to wash out said gas current once more, for example, with water in order to eliminate the washing liquid carried along and then to dry it. Only then it can be reconducted into the third distillation stage for driving the monovinyl-acetylene off the chloroprene without a later contamination of the pure chloroprene in the sump of the third distillation stage taking place.

On the other hand, it is necessary that the washing out of the inert gas be so intense that really no monovinyl-acetylene or dilution gas added to it such as n-butane (as described later) adheres to the inert gas since the chloroprene obtained in a pure form in the sump of the third distillation stage would be rendered impure. This should be avoided in any case in the process for the manufacture of pure chloroprene according to the invention.

It is furthermore advantageous to use chloroprene as washing liquid for washing out the inert gas current conducted in the little cycle and charged with monovinyl-acetylene which chloroprene is taken from the pure chloroprene obtained in the sump of the third distillation stage as final product and which is used at a temperature corresponding to the washing process. The mixture of chloroprene and monovinyl-acetylene obtained in the subsequent washing out can then simply be reconducted into the separating device, for example it can be added to the mixture of chloroprene and monovinyl-acetylene introduced into the first distillation stage.

When using chloroprene as washing liquid, the boiling out of the monovinyl-acetylene therefore takes place in the separating device. When using other washing agents, additional separating devices are required which fact increases the cost of the total unit and requires the storage of the special washing agent.

Within the scope of the process, the selection of chloroprene for washing out the monovinyl-acetylene from the inert gas is therefore the most convenient. Otherwise, only washing liquids may be used which can easily be separated from the monovinyl-acetylene.

Finally, when chloroprene is used it is not necessary, as for example with the use of acetone, methanol, other lower alcohols or the like, to free the cycled inert gas prior to introducing it into the third distillation stage of the washing liquid which may be carried along.

A further advantage with the use of chloroprene obtained in the unit as washing liquid also consists in the fact that it is not absolutely necessary that the mixture of monovinyl-acetylene and inert gas which leaves at the head of the third distillation stage is completely free of chloroprene when used for the washing process.

It is generally necessary to cool the chloroprene obtained in the sump of the third distillation stage which is partially used for subsequently washing out the inert gas current charged with monovinyl-acetylene to the temperature corresponding to the washing process.

The pressures in the third distillation stage on one hand and in the following washing process on the other hand may be so different that a previous cooling of the chloroprene portion used as washing liquid is not absolutely necessary and can therefore be dispensed with.

The large amounts of monovinyl-acetylene conducted in the large and in a little cycle in the process of the invention are present partially in the gaseous and partially in the liquid state of aggregation admixed with more or less large portions of chloroprene and eventually also with impurities. It is known that monovinyl-acetylene already at pressures below 1 atmosphere, i.e. at lower pressures than acetylene tends to spontaneous decomposition. Explosion tests with monovinyl-acetylene and mixtures of monovinyl-acetylene and chloroprene obtained for example with the process of the invention in gaseous as well as in liquid state showed that these mixtures can be ignited by electrically produced sparks or incandescent filaments and that they explode very violently. Such causes voluntarily brought about in the explosion tests mentioned can develop in the producing apparatus for chloroprene as well as in the adjacent distilling apparatus for the isolation and purification of the chloroprene. Since the causes of explosions are generally due to the operational situations and cannot be foreseen, they represent with the large amounts of gaseous, and in the separating apparatus even partially liquid monovinyl-acetylene, a great danger for the plant.

Among others, small local fires or electrostatic charges of escaping gases or liquids as well as especially the monovinyl-acetylene copper which may be formed in the contact solution may cause explosions.

The tendency of acetylene spontaneously to decompose with explosion can be reduced by diluting it with foreign gases. With the admixture of sufficient amounts of an inert gas the spontaneous decomposition may be completely avoided. The research made within the scope of the invention showed that monovinyl-acetylene acts, especially in the gaseous state, similar to acetylene.

Explosion tests with gaseous monovinyl-acetylene and nitrogen as diluting gas showed that the addition of inert gas stabilizes the effect with regard to an inhibition of the explosive spontaneous decomposition of monovinyl-acetylene.

According to a further characteristic feature of the process of the invention, there may be added to the monovinyl-acetylene conducted in the large as well as in the little cycle for desensitizing between about 15 and about 60% by volume of at least one diluting gas such as nitrogen or n-butane, the percent by volume being calculated on the total amount of monovinyl-acetylene and diluent gas. Here, as well as in the following, the indications of percent by volume relate to the composition of the gas mixture at the moment of introduction into the chloroprene reactor, i.e. at the moment of the highest concentration of monovinyl-acetylene which subsequently is partially reacted in the reactor, whereas the total amount of the diluent gas in maintained. It is possible for example to add to the cycled monovinyl-acetylene between about 50 and about 60% by volume of nitrogen, the percent by volume now being calculated on the sum of monovinyl-acetylene and nitrogen.

Furthermore, it has been found that the dilution with nitrogen in the present process does not guarantee safety in all cases since, for example, liquid monovinyl-acetylene in the distilling columns and in other parts of the unit is not stabilized. Moreover, it is generally necessary to add at least 50–60% by volume of nitrogen in order to guarantee that no explosion takes place at a total pressure of 1–1.5 atmospheres. The addition of such high amounts of nitrogen however causes a strong reduction of the reaction of monovinyl-acetylene to form chloroprene in the chloroprene reactor and necessitates an enlargement of the reactor which fact involves a considerable raise in price of the unit and of the higher amount of contact substance consequently required.

According to the process of the invention, it is therefore advantageous to operate in a manner that, instead of nitrogen or other gases such as for example hydrogen or methane, n-butane is suitably added as diluting gas to the monovinyl-acetylene conducted in the cycle. The content of n-butane in the cycle gas amounts to about 15—about 60% by volume, preferably to about 35—about 40% by volume, the percent by volume being calculated on the sum of monovinyl-acetylene and n-butane.

It must be taken into consideration that the ratio of the volume of monovinyl-acetylene and n-butane, which dissolved in chloroprene both reach the third distillation stage, to the volume of the inert gas conducted in the little cycle in the third distillation stage varies between about 1:2 and about 1:50. Of course, the ratio still exists at the moment when subsequently conducting the monovinyl-acetylene/n-butane mixture to the washing out from the inert gas.

The chloroprene is obtained in the third distillation stage in the liquid and pure state. For 1 kg. of chloroprene obtained as final product, about 0.2 to about 5 nm.$^3$ (normal cubic meter at 0° C. and 1 atmosphere) of inert gas are introduced into the sump of this distillation stage. It is preferably to use about 1–2 nm.$^3$ of inert gas per kg. of chloroprene obtained in the liquid state. These relations are valid for the use of pure monovinyl-acetylene as well as for the use of a mixture of monovinyl-acetylene and n-butane in the starting mixture, i.e. about 2–50 nm.$^3$ of inert gas are added to the sump of the third distillation stage per 1 nm.$^3$ of monovinyl-acetylene or mixture of monovinyl-acetylene and n-butane flowing off at the head of the third distillation column.

It may also be possible to add to the cycled monovinyl-acetylene between about 35 and about 40% by volume of technical n-butane, the percent by volume being calculated on the sum of monovinyl-acetylene and technical n-butane, in which case the technical n-butane may contain as impurities up to 30% by volume of at least one aliphatic hydrocarbon such as butylene, propane, isobutane, isopentane and pentane, the percent by volume being calculated on the sum of n-butane and impurities. The mixture of hydrocarbons added to the monovinyl-acetylene for diluting then contains at least about 70% of n-butane, preferably however, about 85–95% of n-butane in addition to other aliphatic hydrocarbons. The mixing ratio of the hydrocarbons including the n-butane should of course be such that the boiling point as well as the vapor pressure of the n-butane is not essentially changed. Therefore, only mixtures of complementary hydrocarbons of which the differing properties more or less compensate one another should be added to the technical n-butane, or the proportions of foreign gases in the n-butane should be so little that the boiling point and the vapor pressure are not essentially changed. Technically pure n-butane should usually be used as diluting gas without further additions, that is other gases such as propane, or isopentane should only be present as impurities.

Since n-butane or n-butane in admixture with the hydrocarbons mentioned and in the corresponding composition have practically the same boiling point and the same vapor pressure as monovinyl-acetylene and furthermore since they are soluble in liquid monovinyl-acetylene in any ratio, n-butane or a mixture of n-butane and butylene, isobutane, propane and isopentane simultaneously stabilize the gaseous phase as well as the liquid phase of monovinyl-acetylene. A great danger in the processes for the manufacture of chloroprene hitherto applied is thus avoided and simultaneously a considerable technical advantage is obtained. In no case of the separating process described, can the once adjusted ratio of monovinyl-acetylene to n-butane or the mixture of n-butane with the other aliphatic hydrocarbons already mentioned move in the direction of a dangerous concentration of monovinyl-acetylene as may be the case with nitrogen or other inert gases. All parts of the unit are now protected against an explosive spontaneous decomposition of monovinyl-acetylene.

A further great and surprising advantage attained by the use of n-butane or the gas mixture mentioned consists in the fact that contrary to other additions of foreign gases considerably smaller quantities are sufficient in order to obtain the same desensitizing effect. Explosion tests proved that, for example a mixture of 35–40% by volume of n-butane and 65–60% by volume of monovinyl-acetylene even at a total pressure of 6–10 absolute atmospheres cannot be brought to explosion by any ignition. It is also impossible to bring to explosion a corresponding mixture of monovinyl-acetylene with technical n-butane in which the technical butane contains about 85% by volume of n-butane, 2% by volume of butylene, 7% by volume of isobutane, 1% by volume of propane and 5% by volume of isopentane.

The reduction of the partial pressure and of the reaction of the gaseous monovinyl-acetylene entering the chloroprene reactor and having a content of about 35–40% by volume of n-butane calculated on the total weight can now be compensated without danger by adjusting a higher total pressure of about 2 absolute atmospheres. Still higher total pressures in the reactor, for example up to 5 absolute atmospheres, which can also be adjusted without danger with mixtures of n-butane and monovinyl-acetylene of this kind furthermore enable an increase of the partial pressure of the monovinyl-acetylene and proportional increase in the yield as compared with the method of working at normal pressure and with pure monovinyl-acetylene.

With the use of mixtures of monovinyl-acetylene and butane, it is now possible as a principle also to perform the isolation and purification of chloroprene at higher pressures. The reflux required in the distilling columns are now produced by condensing mixture of monovinyl-acetylene and n-butane also at higher temperatures by which fact the use of expensive refrigerating brine can be wholly or partially dispensed with or wholly or partially replaced by cooling water.

In order to maintain the large cycle of gaseous monovinyl-acetylene when pure monovinyl-acetylene is used it is absolutely necessary to operate with special compressors such as liquid ring compressors to avoid ignitions which may be caused by mechanical friction.

It is known however that the efficiency of compressors of this kind is reduced by about 50% for example as compared with piston compressors.

When using a mixture of n-butane and mono-vinyl-acetylene having a composition as described above, it is not required to apply these special compressors. The use of other compressors or blowers with high efficiency is also possible thus obtaining a further reduction in energy and expense.

The process according to the present invention is carried out as follows:

The gas mixture containing chloroprene and monovinyl-acetylene and resulting from the reaction of monovinyl-acetylene and hydrogen chloride in contact solutions is deacidified by washing it with water. The gas mixture containing in addition to unreacted monovinyl-acetylene between about 2 and about 25% by volume of chloroprene and between about 0.1 and about 5% volume of higher boiling impurities is then subjected to a rectifying distillation in which the mixture is separated into higher boiling constituents, pure monovinyl-acetylene and chloroprene saturated with monovinyl-acetylene from which chloroprene the monovinyl-acetylene is subsequently distilled off. The percents by volume are calculated on the total volume of monovinyl-acetylene, chloroprene and higher boiling constituents. In the distillation stages with partial condensation, an additional inert gas current is maintained which promotes the respective driving off. Said gas current, in the case of the first separation into higher boiling constituents, monovinyl-acetylene and chloroprene saturated with monovinyl-acetylene, consists of monovinyl-acetylene and, in the case of the subsequent separation of the chloroprene from the monovinyl-acetylene carried along in dissolved state, consists of nitrogen. In the distillation stages, pressures of between about 1.02 absolute atmospheres (0.02 atmosphere gauge) and about 2 absolute atmospheres (1 atmosphere gauge) are maintained. In the following washing out of the nitrogen from the monovinyl-acetylene carried along in a countercurrent to pure chloroprene as washing liquid and at temperatures between about −30° and 0° C., pressures between about 1.05 absolute atmospheres (0.05 atmosphere gauge) and about 10 atmospheres (9 atmospheres gauge) are maintained. The additional inert gas currents introduced into the distillation stages are conducted in a cycle and to the distillation stages is added phenothiazine as polymerization inhibitor stabilizing the liquid phase. Finally, for desensitizing the monovinyl-acetylene by dilution between about 35 and about 40% by volume of n-butane, there may be added to the monovinyl-acetylene, the percent by volume being calculated on the sum of monovinyl-acetylene and n-butane.

The enclosed drawing diagrammatically represents a flow scheme of a suitable unit for carrying out the process according to the invention.

Into reactor 3 at the bottom, there is introduced monovinyl-acetylene through delivery pipe 1 to which hydrogen chloride is added through delivery pipe 2. The reaction products and unreacted monovinyl-acetylene leave reactor 3 at the top through outlet pipe 4. In the adjacent water wash 5, the gas current is deacidified and then well dried in calcium chloride tower 6. The starting gas current for the following distillation is then introduced through conduit 7 at about half the height into distilling column 8 which is enlarged towards the head and on which column partially condensing condenser 9 is mounted. The condenser 9 is operated in a manner that parts of the chloroprene and the entire portions of all higher boiling constituents such as methylvinyl-ketone, dichlorobutene and chloroprene oils are completely liquefied and that it produces a reflux additionally containing dissolved monovinyl-acetylene. At the bottom of column 8, which may be heated by evaporator 10, a gas current of monovinyl-acetylene free of chloroprene is introduced through delivery pipe 11. This gas current of monovinyl-acetylene causes the partial pressure of chloroprene in the separating column to be small and a reduction of temperature in the sump of column 8 which sump is practically free of chloroprene. At the head of column 8, a polymerization inhibitor suitably dissolved in chloroprene is injected through delivery pipe 12.

By these steps, a polymerization of chloroprene in distilling column 8 is avoided. The assumption that the same effect might be obtained with the aid of a vacuum distillation was not confirmed by practical experiments. Traces of oxygen which may penetrate with a vacuum distillation are probably the cause for this phenomenon. When operating according to the process of the invention at a slight excess pressure, oxygen can not possibly penetrate into the column.

The high boiling impurities mentioned above leave column 8 by way of outlet pipe 13 whereas the monovinyl-acetylene from the starting gas mixture and the additional gas as well as the chloroprene leave together at the head of column 8 by way of outlet pipe 14 and are then introduced into the second distilling column 15. This column, as well as column 8, is provided with interchangeable bottoms or filled with Raschig rings. The condenser similarly mounted on column 15 is operated in a manner that the entire amount of chloroprene from the gas current is condensed. Said chloroprene flows down together with dissolved monovinyl-acetylene as reflux whereby corresponding to the elevation in temperature brought about by a heating device 16 at the bottom of column 15, a concentration of chloroprene as compared with the monovinyl-acetylene takes place as the contents move downwardly. By way of delivery pipe 17, an inhibitor is injected at the head into column 15 similar to column 8. The main quantity of monovinyl-acetylene free of chloroprene leaves then through outlet pipe 18 at the head of column 15, and is partially reconducted to the reaction in reactor 3 by rotary compressor 19 via conduit 1, whereas a branched off part is reconducted as cycle gas into the sump of the first distilling column 8 by way of valve 20, conduit 21, calcium chloride drying tower 22 and conduit 11 as already described.

The liquefied and concentrated chloroprene still containing dissolved monovinyl-acetylene leaves via cooled siphon 23 the bottom of the second distilling column 15 and is then introduced by way of siphon 23 at about half the height into the third distilling column 24 which is enlarged towards the head and on which condenser 25 is mounted. Column 24 is heated by evaporator 26 at the bottom. Near the bottom pure nitrogen is simultaneously blown in through delivery pipe 27. The partially condensing condenser 25 is operated in a manner that the largest part of the chloroprene condenses while the nitrogen introduced at the bottom and charged with the portion of monovinyl-acetylene which has previously been dissolved in the chloroprene leaves by way of outlet pipe 28 at the head of condenser 25.

In the separating column 24 wherein chloroprene increasingly concentrates downward as compared with monovinyl-acetylene, the gases in the entire gas volume are diluted with nitrogen. Simultaneously, the sump temperature is reduced due to the decrease of the partial pressure. By way of conduit 29, similar to columns 8 and 15, an inhibitor is introduced at the head of distilling column 24 in order to stabilize the liquid phase. By this step a polymerization of chloroprene is also avoided in the third distilling column 24.

Part of the chloroprene freed of the high boiling impurities as well as of the monovinyl-acetylene and practically 100% pure is drawn off as final product just above the bottom of distilling column 24 and evaporator 26 by way of conduit 30, whereas another part leaves directly at the bottom of column 24 by way of conduit 31 and is pumped by means of pump 32 via conduit 33 into washing tower 34. The latter current of chloroprene can be cooled to a low temperature, for example to about —10° to —20° C. by means of a cooling device not shown in the drawing. The nitrogen current charged with monovinyl-acetylene can be introduced into washing tower 34 by way of outlet pipe 28, compressor 35 and conduit 36. The washing tower is operated at an excess pressure of for example 1–2 atmospheres gauge. The usually precooled chloroprene conducted through conduit 33 under pressure and conducted in a countercurrent to the gas current now dissolves all monovinyl-acetylene out of the nitrogen current, whereby it is necessary to eliminate the absorption heat by suitable steps.

The pure nitrogen current then leaves the washing tower 34 via outlet pipe 37 and is released by means of valve 38 into delivery pipe 27 which joins reactor 3 and thus conducted in the little cycle. The chloroprene now charged with monovinyl-acetylene is taken off at the bottom of washing tower 34 by way of outlet pipe 39 and is introduced via valve 40 into delivery pipe 7 for the starting gas mixture flowing into the first distilling column and thus reconducted in a cycle into the distilling operation.

It is evident that via outlet pipe 30 of the third distilling column 24, an amount of chloroprene approximately that actually produced in reactor 3 is obtained as final product. The chloroprene which is taken off column 24 via outlet pipe 31 for the washing process in washing tower 34, is reconducted via conduit 39 to the first distilling column 8 and thus in a cycle to the distilling operation.

A possible loss of nitrogen is replaced by way of delivery pipe 41 and the monovinyl-acetylene reacted in reactor 3 is replaced by way of delivery pipe 42. Before adding the nitrogen it is expedient to free it completely of oxygen.

It is possible to dispense with the two drying towers 6 and 22 in the flowing scheme, in which case the portion of water present in the gases is separated during the distilling operation.

The unit for carrying out the process of the invention described above represents only one of the technical variants. There may be mentioned another variant in which, contrary to the description of the drawing, a process for the manufacture of chloroprene is carried out in a manner that in a first distillation stage only the monovinyl-acetylene portion of the reaction mixture is separated from the chloroprene and the impurities which are obtained as sump saturated with dissolved monovinyl-acetylene.

The monovinyl-acetylene leaving at the head of the first distillation stage is then reconducted to the reaction with hydrogen chloride in aqueous cuprous chloride solutions. Only in the second distillation stage is the chloroprene then separated from the impurities with the aid of a gas current from a little additional cycle of monovinyl-acetylene in which case the impurities are obtained as sump. The starting gas mixture is introduced into the second distillation stage at about ⅓ of the height of the column and at about ⅔ of the height of the column chloroprene saturated with monovinyl-acetylene is taken off as a mixture consisting of for example about 70% of chloroprene and about 30% of monovinyl-acetylene. At the head of the distillation stage about that portion of pure monovinyl-acetylene flows off which merely travels as expulsion gas in the little cycle of the second distillation stage.

According to said different step, there are recovered at the head of the first distillation stage the excess only of the starting monovinyl-acetylene and at the head of the second distillation stage separately, the monovinyl-acetylene conducted in a cycle as expelling gas, whereas in the drawing these gaseous monovinyl-acetylene yields are drawn off together at the head of the second distillation stage. Subsequently they must be split into the desired proportions.

Contrary to the flow diagram shown in the drawing, it is not necessary to conduct the mixture of chloroprene and monovinyl-acetylene from the washing process of the inert gas (following the third distillation stage) to the first distillation stage, but the mixture of chloroprene and monovinyl-acetylene can be directly introduced into the second distillation stage. The substantial and common characteristic of every possible flow diagram of the invention is the fact that in the distilling columns an additional intense gas current is maintained, preferably under at least slightly elevated pressure and that in the separation of chloroprene from the higher boiling impurities monovinyl-acetylene is used as gas current, and that for separating the chloroprene from the lower boiling monovinyl-acetylene, nitrogen or any other inert gas is used. It is furthermore appropriate to free for example the nitrogen from monovinyl-acetylene by washing with solvents such as acetone or as described preferably with chloroprene at elevated pressure and suitably at low temperatures whereby the amounts of solvent required for washing out can be strongly reduced. The application of higher pressures in the washing process of the monovinyl-acetylene described is rendered possible by the strong dilution of the monovinyl-acetylene, for example, with nitrogen at low temperatures since the spontaneous decomposition of monovinyl-acetylene is avoided by diluting it with inert gases and by operating at low temperatures.

Finally it must be emphasized that according to the process of the present invention the chloroprene is not only isolated in the form of the crude product and obtained without polymerization but it is simultaneously purified and obtained in a very pure form in the sump of the last distillation stage.

Furthermore, the numerous cycling currents of the individual gas portions are characteristic of the process according to the present invention. First conducted in a cycle is the unreacted monovinyl-acetylene flowing off the reactor which current according to the flow scheme is taken off at the head of the second or the first distillation stage and reconducted into the reactor. Dissolved in chloroprene, it only partially reaches the third distillation stage and from there, subsequent to its expulsion from the washing tower from which it is reconducted in a cycle, for example, again dissolved in chloroprene, into the first distillation stage. The second cycle consists of a nearly constant amount of monovinyl-acetylene used as additional expulsion gas for separating the chloroprene from the higher boiling impurities and which cycle comprises according to the flow scheme the first and the second distillation stage. But according to another variant as already described above, it may only involve the second distillation stage whereas at the head of the first stage only the unreacted staring monovinyl-acetylene is drawn off. The third cycle finally consists of an inert gas such as nitrogen, which is used for expelling the residual monovinyl-acetylene from the chloroprene and the third and generally last distillation stage. Said gas is conducted in a cycle via the third distillation stage and the adjacent washing tower.

Of course, a dilution gas such as for example n-butane added to the monovinyl-acetylene for desensitizing purposes, joins the cycling currents of monovinyl-acetylene, but care must be taken that in case nitrogen is used as diluent gas instead of n-butane the nitrogen does not penetrate by way of the siphon into the third distillation stage since, unlike butane, it is not soluble in monovinyl-acetylene. In this case, the cycle of dilution gas consisting of nitrogen is separated from the inert gas cycle of nitrogen in the third distillation stage with the aid of the siphon.

In the case n-butane is used as diluent gas, it is introduced proportionally with the monovinyl-acetylene dissolved in chloroprene by way of the siphon at the third distillation stage. From there it moves to the washing tower and after the washing, it returns to the separating unit together with the monovinyl-acetylene dissolved in chloroprene as washing liquid.

Into the unit are introduced only monovinyl-acetylene and hydrogen chloride, corresponding to the portions of the gases being reacted as well as inert gas to complete possible losses and at the head of the distillation stages substances inhibiting the polymerization. In addition to the higher boiling impurities resulting from the reaction and which are drawn off the sump of the first or second distillation stages according to the process, only pure chloroprene is taken off from the sump of the last, generally the third distillation stage.

The following examples serve to illustrate the invention but they are not intended to limit it thereto.

*Example 1*

Via pipe 1 65 nm.$^3$/h. (normal cubic meter at 0° C. and 1 atmosphere per hour) of monovinyl-acetylene conducted in a cycle are introduced after the addition of 5 nm.$^3$/h. of fresh monovinyl-acetylene via delivery pipe 42 and 5 nm.$^3$/h. of hydrogen chloride via delivery pipe 2 under a pressure of 1.5 atmospheres (0.5 atmosphere gauge) into reactor 3 at the bottom. The reaction gases leave reactor 3 at the head and consist of 16 kg./h. of chloroprene, 1.5 kg./h. of dichlorobutene and chloroprene oils, 0.1 kg./h. of methylvinyl-ketone, 148 kg./h. of monovinyl-acetylene and 2.8 kg./h. of water.

After deacidifying in water wash 5 and subsequent drying in calcium chloride tower 6, the gas mixture travels via delivery pipe 7 into column 8 together with 20 kg./h. of chloroprene and 21.2 kg./h. of monovinyl-acetylene previously added by way of conduit 39 from the washing tower 34. Column 8 is fed from below by way of conduit 11 with 30 nm.$^3$/h. of monovinyl-acetylene which is free of chloroprene, the sump of column 8 being kept at +50° C. Partial condenser 9 at the head of column 8 working at +15° to +20° C. is operated with warm water having a temperature of about +12° C. In the sump of column 8, 1.5 kg./h. of dichlorobutene and chloroprene oils as well as 0.1 kg./h. of methylvinyl-ketone, which are practically free of chloroprene, are discharged as impurities.

104 nm.$^3$/h. of monovinyl-acetylene together with 36 kg./h. of chloroprene leave at the head of column 8 and enter into column 15 at the bottom, the head temperature of column 15 being maintained at about +5° C. 95 nm.$^3$/h. of monovinyl-acetylene practically free of chloroprene leave at the head of column 15. With the aid of rotary compressor 19, the monovinyl-acetylene is conducted in a cycle.

36 kg./h. of chloroprene and 21.2 kg./h. of monovinyl-acetylene are drawn off the second column 15 at the bottom at a temperature of +25° C. and cooled at once to about 0° C. in siphon 23 and then introduced into the third column 24. Column 24 is fed from below with 14 nm.$^3$/h. of nitrogen containing 2 kg./h. of chloroprene under a pressure of 1.3 atmospheres (0.3 atmosphere gauge). The nitrogen current together with 21.2 kg./h. of monovinyl-acetylene and 4 kg./h. of chloroprene leaves column 24 at a head temperature of —10° C. and is introduced by means of compressor 35 into washing tower 34 at the bottom.

16 kg./h. of chloroprene which is free of monovinyl-acetylene are discharged as final product from column 24 via conduit 30 whereas 18 kg./h. of chloroprene are withdrawn from the sump of column 24, which column has a sump temperature of about +15° C., said chloroprene is cooled to —20° C., the required cooler not being shown in the drawing. The cooled portion of chloroprene is brought to the head of washing tower 34 by means of pump 32. Washing tower 34 is operated at 2.5 atmospheres (1.5 atmospheres gauge). The nitrogen current freed of monovinyl-acetylene leaves with 2 kg./h. of chloroprene the washing tower at the top and is released by way of valve 38 and conduit 27 into column 24. At the bottom of washing tower 34, 20 kg./h. of chloroprene and 21.2 kg./h. of monovinyl-acetylene leave which are reconducted via valve 40 and conduit 39 into column 8.

Through each of the conduits 12, 17 and 29, 30 g./h.

of phenothiazine are injected into columns 8, 15 and 24 in the form of solutions of 2% strength in chloroprene as polymerization inhibitor.

*Example 2*

A mixture of the cycling gas consisting of 37 nm.$^3$/h. of monovinyl-acetylene and 28 nm.$^3$/h. of butane (which is added for desensitizing by dilution) is compressed to 1.6 atmospheres (0.6 atmosphere gauge) after the addition of 5 nm.$^3$/h. of fresh monovinyl-acetylene and then introduced together with 5 nm.$^3$/h. of hydrogen chloride into reactor 3 at the bottom. The reaction gases leaving reactor 3 then consist of a mixture of 16 kg./h. of chloroprene, 1.5 kg./h. of dichlorobutene and chloroprene oils, 0.1 kg./h. of methylvinyl-ketone, 85 kg./h. of monovinyl-acetylene, 76 kg./h. of butane and 2.8 kg./h. of water. After deacidifying the gas mixture in water wash 5 it is dried in calcium chloride tower 6 and introduced into column 8 together with 20 kg./h. of chloroprene, 10 kg./h. of monovinyl-acetylene and 6 kg./h. of butane flowing in from washing tower 34 via conduit 39. A mixture consisting of 17 nm.$^3$/h. of monovinyl-acetylene and 13 nm.$^3$/h. of butane flows in at the bottom of column 8, the sump of column 8 being kept at +50° C. 1.5 kg./h. of dichlorobutene and chloroprene oils and 0.1 kg./h. of methylvinyl-ketone practically free of chloroprene are discharged from the sump of column 8, whereas at the condenser 9 which serves for partial condensation of the vapor mixture leaving column 8, a mixture consisting of 58 nm.$^3$/h. of monovinyl-acetylene, 43 nm.$^3$/h. of butane and 36 kg./h. of chloroprene discharges.

The latter mixture enters into second column 15 at the bottom, the head temperature of which column is maintained at about +3° C. 54 nm.$^3$/h. of monovinyl-acetylene and 41 nm.$^3$/h. of butane leave the head of this column practically free of chloroprene at a pressure of 1.05 atmospheres (0.05 atmosphere gauge) and are conducted in a cycle by means of rotary compressor 19. 36 kg./h. of chloroprene, 10 kg./h. of monovinyl-acetylene and 6 kg./h. of butane leave at a temperature of about +30° C. at the bottom of column 15, are cooled in adjacent siphon 23 to +10° C. and enter the third column 24.

14 nm.$^3$/h. of nitrogen containing 2 kg./h. of chloroprene are introduced at a pressure of 1.3 atmospheres (0.3 atmosphere gauge) into column 24 at the bottom, the the sump temperature being kept at +15° C.

The nitrogen current leaves the head of column 24 at a temperature of about −10° C. charged with 10 kg./h. of monovinyl-acetylene, 6 kg./h. of butane and 4 kg./h. of chloroprene. This is then compressed by means of compressor 35 to 3 atmospheres (2 atmospheres gauge) and introduced into washing tower 34 at the bottom into which tower are injected at the head by means of pump 32 18 kg./h. of chloroprene taken from the sump of column 24 and cooled to −20° C. prior to introducing it into washing tower 34. 16 kg./h. of chloroprene free of monovinyl-acetylene are discharged as pure final product at the bottom of the third column 24 by way of conduit 30.

20 kg./h. of chloroprene wherein 10 kg./h. of monovinyl-acetylene and 6 kg./h. of butane are dissolved flow off at the bottom of washing tower 34 and are reconducted into the first column 8 by way of valve 40 and conduit 39. At the head of washing tower 34 14 nm.$^3$/h. of nitrogen charged with 2 kg./h. of chloroprene flow off which subsequent to release at valve 38 are reconducted into the third column 24.

Through each of conduits 12, 17 and 29 30 g./h. of phenothiazine are injected into columns 8 15 and 24 in the form of saturated solutions in chloroprene as polymerization inhibitors.

Finally, it should be mentioned that owing to the dilution of the monovinyl-acetylene with butane the reactor 3 must contain a correspondingly greater amount of contact (about 1.7 times) than in the case of the method of operating according to Example 1.

*Example 3*

With otherwise the same amounts of the portions of deacidified dried reaction gas introduced into column 8 as indicated in Example 2, i.e. 16 kg./h. of chloroprene, 1.5 kg./h. of higher boiling impurities, 85 kg./h. of monovinyl-acetylene and 76 kg./h. of butane there are introduced into column 8 through conduit 39 additionally 17 kg./h. of chloroprene, 7 kg./h. of monovinyl-acetylene and 4 kg./h. of butane in the liquid form. A mixture of 17 nm.$^3$/h. of monovinyl-acetylene and 13 mm.$^3$/h. of butane additionally flows into column 8 at the bottom, the sump of column 8 being kept at +50° C. From the sump the higher boiling constituents which are practically free of chloroprene are discharged whereas 57 nm.$^3$/h. of gaseous monovinyl-acetylene, 42 nm.$^3$/h. of butane and 33 kg./h. of chloroprene stream out of condenser 9 of column 8. The mixture enters into the second column 15 at the bottom, the head temperature of said column being kept at +3° C. 54 nm.$^3$/h. of monovinyl-acetylene and 41 nm.$^3$/h. of butane practically free of chloroprene leave the head of column 15 at a pressure of 1.05 atmospheres (0.05 atmosphere gauge) and are cycled by rotary compressor 19. 33 kg./h. of chloroprene, 7 kg./h. of monovinyl-acetylene and 4 kg./h. of butane leave at a temperature of about +36° C. at the bottom of column 15 and are conducted by way of siphon 23 into the third column 24 in which column are introduced at the bottom 30 nm.$^3$/h. of nitrogen at a pressure of 1.4 atmospheres (0.4 atmosphere gauge) containing 1 kg./h. of chloroprene. The sump temperature of column 24 is maintained at 0° C. The nitrogen current leaves the head of column 24 at a temperature of about −15° C. charged with 7 kg./h. of monovinyl-acetylene, 4 kg./h. of butane and 3 kg./h. of chloroprene. The current is compressed by means of compressor 35 to 21 atmospheres (20 atmospheres gauge) and then introduced into washing tower 34 at the bottom, in which tower 15 kg./h. of chloroprene are injected by means of pump 32. Said chloroprene as well as the pure chloroprene obtained as final product are taken off the sump of column 24, the temperature of said chloroprene rises to about +10° C. until it runs into washing tower 34.

From the sump of the washing tower, 17 kg./h. or chloroprene, 7 kg./h. of monovinyl-acetylene and 4 kg./h. of butane flow off which are reconducted into column 8. At the head of washing tower 34, 30 nm.$^3$/h. of nitrogen charged with 1 kg./h. of chloroprene flow out, which after release to 1.4 atmospheres (0.4 atmosphere gauge) are reconducted into third column 24.

Into columns 8, 15 and 24, a phenothiazine solution is introduced as described in Example 2.

We claim:

1. A process for manufacturing pure chloroprene which comprises reacting monovinylacetylene with hydrogen chloride in an initial reaction zone to obtain a starting gas mixture comprising chloroprene and monovinylacetylene wherein the chloroprene forms about 2–25% by volume of the mixture and wherein there are present about 0.1–5% by volume of higher boiling impurities resulting from the reaction, washing said gaseous mixture with water to de-acidify the mixture, distilling the gaseous mixture to separate it into higher boiling impurities, pure monovinylacetylene and a monovinylacetylene-saturated chloroprene mixture respectively, maintaining a gaseous current of monovinylacetylene during the said distillation step, separating the monovinylacetylene in the saturated chloroprene mixture from the chloroprene therein in a subsequent distillation step, introducing an inert gas consisting essentially of nitrogen in the last-mentioned distillation step, and maintaining a pressure of up to about 5 atmospheres during the distillation steps.

2. A process for manufacturing pure chloroprene which comprises reacting monovinylacetylene with hydrogen chloride in an initial reaction zone to obtain a starting gas mixture comprising chloroprene and monovinylacetylene wherein the chloroprene forms about 2–25% by volume of the mixture and wherein there are present about 0.1–5% by volume of higher boiling impurities resulting from the reaction, said impurities comprising at least one substance selected from the group consisting of dichlorobutene, chloroprene oils and methylvinylketone, washing said gaseous mixture with water to de-acidify the mixture, distilling the gaseous mixture to separate it into higher boiling impurities, pure monovinylacetylene and a monovinylacetylene-saturated chloroprene mixture respectively, separating the chloroprene and monovinylacetylene from the higher boiling impurities in the first distillation, separating in a second distillation pure monovinylacetylene from the mixture of chloroprene saturated with the monovinylacetylene, maintaining a pressure of up to about 5 atmospheres during the distillation steps, maintaining an additional cycle of gaseous monovinylacetylene through the first and second distillation steps to separate the chloroprene from said higher boiling impurities, the quantity of said additional monovinylacetylene varying between about 1–20 parts by volume calculated on one part by volume chloroprene in the starting gas mixture, dividing into two parts the total amount of monovinylacetylene separated during the second distillation step, said total amount including the monovinylacetylene of the starting mixture plus the additional monovinylacetylene, one of the parts being recycled through the zones where the first and second distillation steps take place while the other part is recycled into the initial reaction zone, cooling the monovinylacetylene saturated chloroprene mixture to a temperature of about 0–40° C., separating the monovinylacetylene from said mixture in a third distillation step to leave pure chloroprene by blowing off the monovinylacetylene by means of an inert gas current comprising at least one member of the group consisting of nitrogen, carbon monoxide, carbon dioxide, hydrogen, methane, argon and helium whereby a mixture of about 1 part by volume monovinylacetylene for each 2–50 parts by volume inert gas is formed, leading said last-mentioned mixture in countercurrent through a washing liquid selected from the class consisting of chloroprene, acetone, methanol, and aromatic oils whereby the monovinylacetylene is separated therefrom, and then recycling the remaining inert gas back to the zones where the distillation steps take place.

3. A process for manufacturing pure chloroprene which comprises reacting monovinylacetylene with hydrogen chloride in an initial reaction zone to obtain a starting gas mixture comprising chloroprene and monovinylacetylene wherein the chloroprene forms about 2–25% by volume of the mixture and wherein there are present about 0.1–5% by volume of higher boiling impurities resulting from the reaction, said impurities comprising at least one substance selected from the group consisting of dichlorobutene, chloroprene oils and methylvinylketone, washing said gaseous mixture with water to de-acidify the mixture, distilling the gaseous mixture to separate it into higher boiling impurities, pure monovinylacetylene and a monovinylacetylene-saturated chloroprene mixture respectively, separating the chloroprene and monovinylacetylene from the higher boiling impurities in the first distillation, separating in a second distillation pure monovinylacetylene from the mixture of chloroprene saturated with the monovinylacetylene, maintaining a pressure of up to about 5 atmospheres during the distillation steps, said separated pure monovinylacetylene being recycled into the initial reaction zone, cooling the monovinylacetylene saturated chloroprene mixture to a temperature of about 0–40° C., separating the monovinylacetylene from said mixture in a third distillation step to leave pure chloroprene by blowing off the monovinylacetylene by means of an inert gas current comprising at least one member of the group consisting of nitrogen, carbon monoxide, carbon dioxide, hydrogen, methane, argon and helium whereby a mixture of about 1 part by volume monovinylacetylene for each 2–50 parts by volume inert gas is formed, leading said last-mentioned mixture in countercurrent through a washing liquid selected from the class consisting of chloroprene, acetone, methanol, and aromatic oils whereby the monovinylacetylene is separated therefrom, then recycling the remaining inert gas back to the zones where the distillation steps take place, and drying both the washed starting gas mixture and the additional current of gaseous monovinylacetylene with calcium chloride prior to the first distillation step.

4. A process for manufacturing pure chloroprene which comprises reacting monovinylacetylene with hydrogen chloride in an initial reaction zone to obtain a starting gas mixture comprising chloroprene and monovinylacetylene wherein the chloroprene forms about 2–25% by volume of the mixture and wherein there are present about 0.1–5% by volume of higher boiling impurities resulting from the reaction, said impurities comprising at least one substance selected from the group consisting of dichlorobutene, chloroprene oils and methylvinylketone, washing said gaseous mixture with water to de-acidify the mixture, distilling the gaseous mixture to separate it into higher boiling impurities, pure monovinylacetylene and a monovinylacetylene-saturated chloroprene mixture respectively, separating the chloroprene and monovinylacetylene from the higher boiling impurities in the first distillation, separating in a second distillation pure monovinylacetylene from the mixture of chloroprene saturated with the monovinylacetylene, maintaining a pressure of up to about 5 atmospheres during the distillation steps, maintaining an additional cycle of gaseous monovinylacetylene through the first and second distillation steps to separate the chloroprene from said higher boiling impurities, the quantity of said additional monovinylacetylene varying between about 1–20 parts by volume calculated on one part by volume chloroprene in the starting gas mixture, dividing into two parts the total amount of monovinylacetylene separated during the second distillation step, said total amount including the monovinylacetylene of the starting mixture plus the additional monovinylacetylene, one of the parts being recycled into the initial reaction zone, adding to the total amount of monovinylacetylene led into the initial reaction zone about 15 to 60% by volume of at least one diluting gas selected from the group consisting of nitrogen, n-butane and technical n-butane, this percentage being calculated on the total amount of monovinylacetylene and diluting gas, said technical n-butane gas containing a maximum of about 30% by volume of impurities comprising at least one aliphatic hydrocarbon selected from the group consisting of butylene, propane, isobutane, isopentane, and n-pentane, the ratio of the hydrocarbons and n-butane being such that the boiling point and the vapor pressure of the mixture remains substantially constant, cooling the monovinylacetylene saturated chloroprene mixture to a temperature of about 0–40° C., separating the monovinylacetylene from said mixture in a third distillation step to leave pure chloroprene by blowing off the monovinylacetylene by means of an inert gas current comprising at least one member of the group consisting of nitrogen, carbon monoxide, carbon dioxide, hydrogen, methane, argon and helium whereby a mixture of about 1 part by volume monovinylacetylene for each 2–50 parts by volume inert gas is formed, leading said last-mentioned mixture in countercurrent through a washing liquid selected from the class consisting of chloroprene, acetone, methanol, and aromatic oils whereby the monovinylacetylene is separated therefrom, and then recycling the remaining inert gas back to the zones where the distillation steps take place.

5. The process of claim 4 wherein the diluting gas is n-butane which is added in an amount of about 35 to 40% by volume, the ratio of the volume of monovinylacetylene and n-butane to the volume of the inert gas in the third distillation step being between about 1:2 and 1:50.

References Cited in the file of this patent

UNITED STATES PATENTS

| | | |
|---|---|---|
| 1,950,431 | Carothers et al. | Mar. 13, 1934 |
| 2,207,784 | Carter | July 16, 1940 |
| 2,415,295 | Cass | Feb. 4, 1947 |

FOREIGN PATENTS

| | | |
|---|---|---|
| 569,097 | Great Britain | May 4, 1945 |

UNITED STATES PATENT OFFICE
CERTIFICATE OF CORRECTION

Patent No. 2,938,060            May 24, 1960

Kurt Sennewald et al.

It is hereby certified that error appears in the printed specification of the above numbered patent requiring correction and that the said Letters Patent should read as corrected below.

Column 11, line 48, for "staring" read -- starting --; line 50, for "expelling" read -- expulsing --; column 14, line 15, for "mm.$^3$/h." read -- nm.$^3$/h. --.

Signed and sealed this 22nd day of November 1960.

(SEAL)
Attest:

KARL H. AXLINE
Attesting Officer

ROBERT C. WATSON
Commissioner of Patents